INVENTORS
NELSON N. ESTES
KENNETH W. HANNAH
CHARLIE D. ANDERSON
CHARLES L. EVERSOLE

BY
ATTORNEY

3,454,258
VALVE FOR AUTOMATIC GAS REGULATING SYSTEM

Nelson N. Estes and Kenneth W. Hannah, Austin, Tex., and Charlie D. Anderson and Charles L. Eversole, Bethesda, Md., assignors to Union Carbide Corporation, a corporation of New York
Original application Jan. 18. 1963, Ser. No. 252,377, now Patent No. 3,256,900, dated June 21, 1966. Divided and this application May 4, 1966, Ser. No. 569,771
Int. Cl. F16k *31/02*
U.S. Cl. 251—140                                      1 Claim

ABSTRACT OF THE DISCLOSURE

A valve for an automatic gas regulating system including a gas-tight housing having a gas inlet provided with a valve seat, a permanent magnet and an electromagnetic coil mounted on a hollow core surrounding the permanent magnet wherein a flexible member is mounted below the hollow core and wherein a valve stem is affixed to both the flexible member and the hollow core, the valve stem being normally biased by the flexible member into a closed position with the valve seat.

---

This application is a division of application Ser. No. 252,377, filed Jan. 18, 1963, now Patent Number 3,256,- 900, issued June 21, 1966.

This invention relates to a gas-regulating system. More particularly, htis invention relates to a system for regulating the concentration of a depolarizer gas in a depolarizer gas-inert gas mixture.

By the term "depolarizer gas" as used herein and in the appended claims is meant a gas possessing sufficient electrochemical activity when acting on a carbon or metal electrode in a galvanic element to alter the potential of the electrode in a reproducible manner. Typical depolarizer gases possessing such activity are oxygen, the halogens, the nitrogen oxides, and the like.

The regulator system of the present invention is well suited to monitor or regulate the concentration of the aforedescribed depolarizer gases in a gas stream or a closed-system environment. The present regulator system is particularly useful for continuous regulation of oxygen concentration in diving units, space capsules, space suits, submarines, oxygen tents, and the like.

While the principle of utilizing the depolarizing properties of a gas as an indicator of the concentration of the same in a gas mixture is known to the art, a need for a reliable regulating system capable of rapid response and reproducible results nevertheless exists. Prior art devices directed to this end rely on the continuous measurement of the current or voltage output of a gas depolarizable galvanic cell, however, such an approach is plagued by uncontrollable variations in the resistance of system components which in turn lead to erroneous output signals. In addition, the ohmic resistance of the sensing cell decreases the cell output voltage in such instances.

It is an object of the present invention to provide a relatively simple and reliable system for regulating the concentration of a depolarizer gas in a given gas mixture.

It is a further object to provide a regulating system capable of reproducible results in a wide range of environmental conditions.

It is another object to provide a regulatory system which relies on the true voltage of an electrochemical sensing unit as a depolarizer gas concentration indicator.

These and other objects will become readily apparent from the ensuing discussion and the appended claims.

The aforesaid objects are achieved by a regulator which includes a galvanic sensing element containing a pair of electrically opposed gas-depolarizable cells one of which is adapted for exposure to a depolarizer gas-inert mixture and the other to a reference gas containing a known amount of depolarizer gas. The true voltage output from these electrically opposed cells is fed into a detector circuit adapted to produce a pulsating output signal in response thereto. The resulting pulsating output signal is then fed to an amplifier, the output of which activates a suitable control valve which in turn regulates the amount of a depolarizer gas added to a depolarizer gas-inert gas mixture.

The invention will now be described in a greater detail with particular reference to the accompanying drawings, in which.

Figure 1:
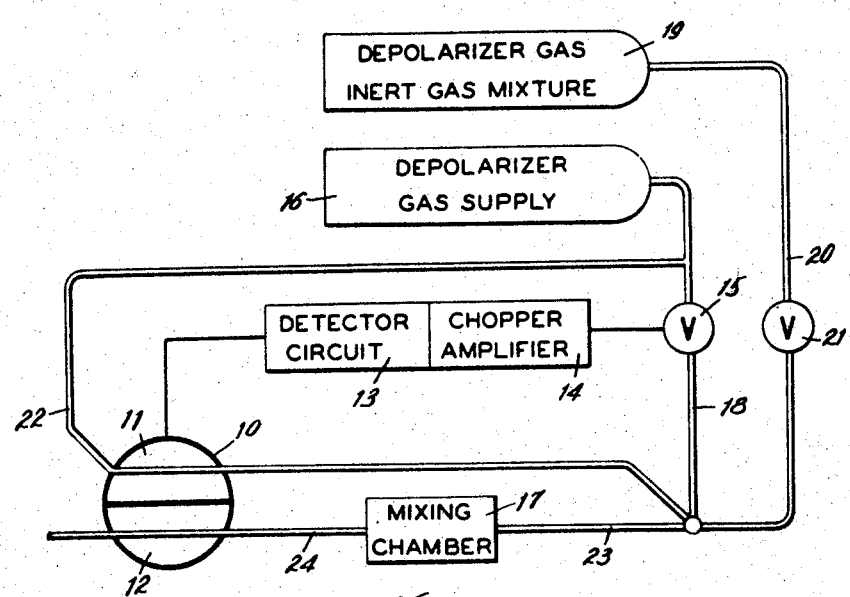
FIG. 1 is a block diagram of the regulating system.

Referring now specifically to FIG. 1, the regulating system comprises a galvanic sensing element 10 containing gas-depolarizable cells 11 and 12. The output signal of the sensing element 10 is fed into a detector circuit 13 which produces a pulsating output signal. This pulsating output signal constitutes the input of a chopper amplifier 14 which produces a direct current output signal in response thereto. The output signal from amplifier 14 activates a control valve 15 which regulates the amount of depolarizer gas passing therethrough from a depolarizer gas supply 16 into a mixing chamber 17 via conduits 18 and 23. The mixing chamber 17 also receives a depolarizer gas-inert gas mixture from a suitable supply 19 via conduits 20 and 23. If desired, the flow rate of the gas mixture can be controlled by means of a manually operated valve 21. The concentration of depolarizer gas in the depolarizer gas supply 16 is known; thus a portion of this gas is employed as a reference gas and is passed through the gas-depolarizable cell 11 via conduit 22. After passing through cell 11 the reference gas in conduit 22 is joined with gas in conduits 18 and 20 and fed into the mixing chamber 17 through conduit 23. In this manner the gas mixture leaving the mixing chamber via conduit 24 contains the desired concentration of depolarizer gas. Any concentration deviations of the gas in the conduit 24 are detected by cell 12 and in the aforedescribed manner communicated to the control valve 15 which then makes the necessary corrections in depolarizer gas concentration.

A suitable galvanic sensing element comprises a pair of gas-depolarizable alkaline or acidic cells having their cathode elements exposed solely to the monitored gas stream and a reference gas stream, respectively. For monitoring the oxygen concentration, the sensing element cells can be composed of any two systems such as oxygen/C/KOH/Zn
oxygen/C/NaOH/Zn
oxygen/C/NH$_4$Cl/Zn
oxygen/C/MgCl$_2$/Zn and the like.

The carbon cathode of one of the cells is exposed to the gas stream, the oxygen concentration of which is to be monitored, and the carbon cathode of the other cell is exposed to a reference gas stream of a known oxygen concentration, usually a gas stream of substantially pure oxygen. Air can be used as the reference gas in some application, if desired.

Each cell generates a voltage varying with the oxygen partial pressure of the gas to which the cathode is exposed. The cells are connected together electrically opposing each other and the potential or voltage differential measured by a detector circuit which includes load resistors connected across each cell. However, during operation under a constant current load the internal (ohmic) resistance of each cell varies in an irregular manner and thus produces variations in cell output voltage even at a constant depolarizer gas concentration in the monitored gas stream. Such variations obviously greatly detract from the ability of a system to give reproducible results and acceptable reliability. Moreover, variations of this nature cannot be tolerated in diving or space exploratory operations where a stable and reliable breathing gas regulating system is of vital importance.

It has been found, however, that the variations due to the internal resistance of each cell as well as those due to varying conductivity of cell contacts and leads because of drastic temperature changes, oxidation, etc., can be eliminated by the regulating system of the present invention. In the present system the cells are operated under a pulse current load and the cell voltage differential is measured between consecutive pulses. In this manner the potential drop across the ohmic resistance of the cell is eliminated and the true voltage generated by the electrochemical processes within the cell can be measured. Shifts in the depolarizer gas adsorption equilibrium on the cathode do not follow the rapid interruptions of current, and the cell output voltage between the current pulses remains at a level corresponding to the average current flow during the preceding pulse.

Figure 2:
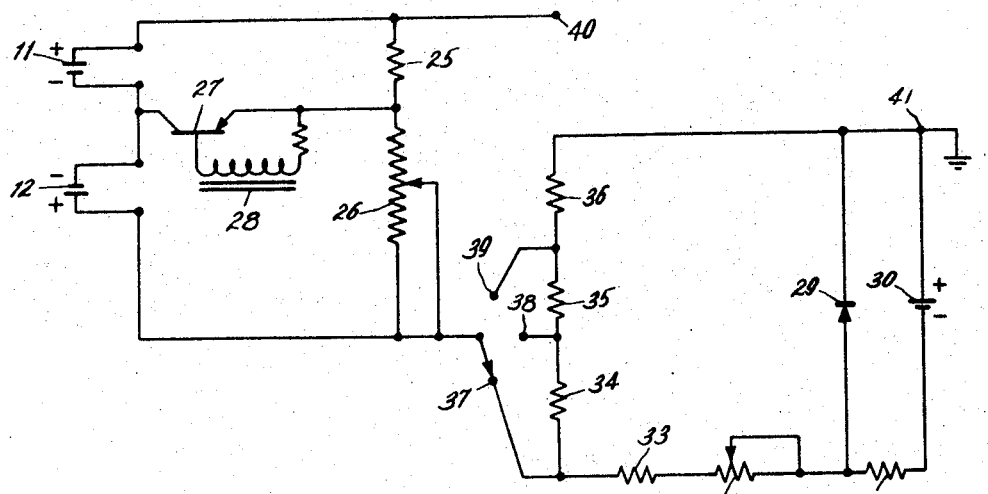
FIG. 2 is a schematic view of a preferred circuit for determining the potential difference of the gas-depolarizable cells of the galvanic sensing element.

In the instant system a pulsating current load can be applied by means of a detector circuit shown in FIG. 2 where gas-depolarizable cells 11 and 12 are connected so as to electrically oppose each other. Two load resistors, 25 and 26, are connected in series and across both gas-depolarizable cells 11 and 12, forming a conductive loop therewith. One of the load resistors preferably is a variable resistor which can be adjusted during calibration of the system. More than two resistors can be used if desired. A transistor 27 is connected into the loop between the cells 11 and 12 by means of its collector electrode and between the load resistors 25 and 26 by means of its emitter electrode. A pulsating emitter bias current is provided by connecting the secondary of a chopper transformer 28 across the emitter and base electrodes of the transistor 27. This pulsating emitter bias current causes a uni-directional pulsating current to pass through the cells 11 and 12 during operation thereby polarizing the cells. This polarizing current can be adjusted by means of variable resistor 26, thus correcting for cell differences by load adjustment. The differential output signal of the detector circuit can be measured across the aforesaid load resistors 25 and 26.

The voltage imposed on the cells by the polarizing current is a function of the cell characteristics, the concentration range of the gas that is to be monitored, etc. In order to be able to calibrate the cells using gas mixtures containing a low percentage of the depolarizing gas, preferably a small bias voltage of a suitable value is added to the output voltage of the sensing cell. For example, if the sensing cell is supplied with a 32 percent oxygen mixture and the reference cell is supplied with pure oxygen, a difference of 16 millivolts will exist between the two cells. If a bias voltage of this amount is switched into the circuit, the amplifier can be balanced to zero with these two gases. In the circuit shown in FIGURE 2, this is achieved by means of a voltage divider (resistor 33, 34, 35 and 36) connected to a suitable D.C. power source 30 in series with a resistor 31 and stabilized by means of a Zener diode 29. The imposed bias voltage can be regulated, if desired, by the variable resistor 32. FIG. 2 further shows means whereby gas mixtures having different predetermined depolarizer gas concentrations can be monitored referring to the same reference gas. This can be achieved by providing a series of bleeder resistors 33, 34, 35, and 36 that can be included in series with variable resistor 32 by means of the set-points 37, 38, and 39. In the aforedescribed detector circuit of FIG. 2 the output signal normally is measured across points 40 and 41. In another variation of this circuit, resistors 34, 35, and 36 can be replaced by a potentiometer and resistor 32 eliminated.

The pulsating output signal is fed into a conventional chopper amplifier 14 indicated in FIG. 1 and having a D.C. output. The input signal to the chopper amplifier is taken when the transistor 27 is in the non-conducting state. This condition can be convenietly achieved by operating chopper 28 180 degrees out of phase with the amplifier choppers.

Figure 3:
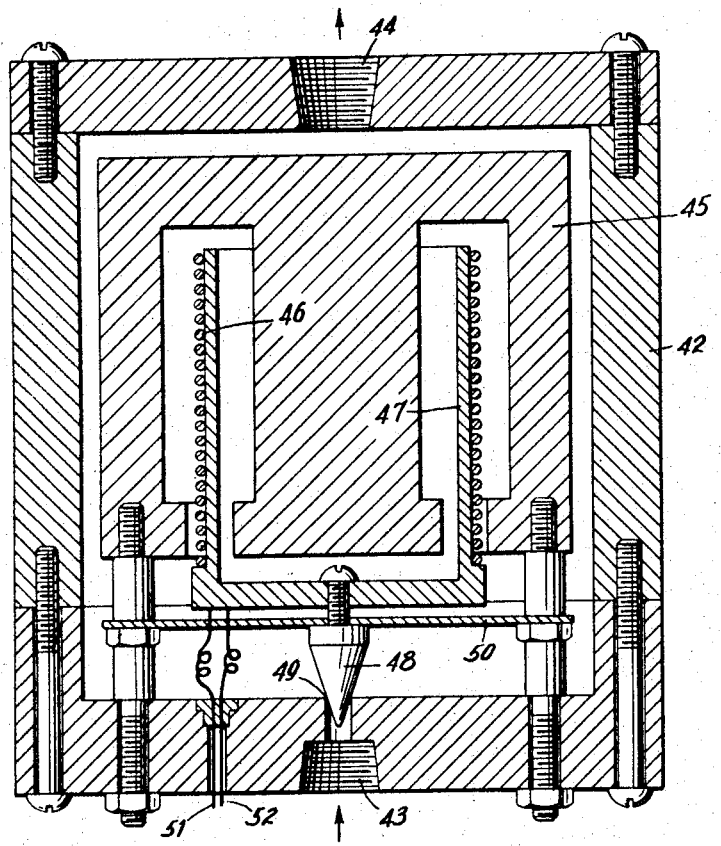
FIG. 3 is a cross-sectional elevation of a suitable control valve.

The direct current signal obtained from the chopper amplifier is employed to activate a control valve 15 indicated in FIG. 1. Preferably this valve has a linear response to the D.C. input signal over the entire operational gas flow range. A suitable valve for this purpose is shown in FIG. 3.

The control valve comprises a gas-tight housing 42 provided with a gas inlet 43 and a gas outlet 44. A permanent magnet 45 generating a magnetic field is rigidity positioned within the housing. An electromagnetic coil 46 is mounted on a hollow core or armature 47 and suspended in the aforesaid magnetic field. To the core 47 is affixed a valve stem 48 which is adapted to mate with valve seat 49 positioned in gas inlet 43. In addition, a flexible member 50 such as a leaf spring, for example, is affixed to the housing 42 and the valve stem 48 so as to bias the latter in the closed position. The extent of the bias is dictated by the requirements of the regulating system and its intended application. The electromagnetic coil 46 is energized by direct current obtained from the chopper amplifier output by means of contacts 51 and 52.

Prior to placing in service, the regulating system is balanced by passing the reference gas through both cells the galvanic sensing element and adjusting a load resistor so that the output signal is zero. If the concentration of the depolarizer gas both in the reference gas stream and the monitored gas mixture is to be the same, this is all the calibration that is necessary. However, since usually the reference gas is taken from the depolarizer gas supply which must have a relatively higher depolarizer gas concentration in order to be an effective make-up stream, further calibration must be carried out. This is done by passing the reference gas through one of the cells and a gas mixture having the desired depolarizer gas concentration through the other cell. The sensing cell load resistor is then further adjusted by applying an additiontl load to obtain a zero output signal. Following this the cell is ready for operation since any concentration deviation from the present one will result in an output signal. Once the regulating system is balanced, it can be set to monitor varying depolarizer gas concentration levels in gas mixtures by placing additional resistors of predetermined values in the detector circuit as discussed above.

We claim:

1. A gas regulating valve comprising a gas-tight housing provided with a gas inlet at one end having a valve seat associated therewith and a gas outlet at the opposite end, a permanent manget for generating a magnetic field, an electromagnetic coil mounted on a hollow core surrounding said permanent magnet and suspended in said magnetic field, a valve stem adapted to close with said valve seat, a flexible member affixed to said housing below said hollow core, said valve stem being affixed to both said flexible member and said hollow core and being normally biased by said flexible member into a closing position with said valve seat, and means for passing direct current through said coil, said permanent magnet, electromagnetic coil, valve stem and flexible member all being completely enclosed within said housing.

References Cited

UNITED STATES PATENTS

| | | | |
|---|---|---|---|
| 2,637,343 | 5/1953 | Matthews | 251—139 X |
| 2,791,394 | 5/1957 | Matthews | 251—139 X |
| 2,920,651 | 1/1960 | Welsh | 251—129 X |
| 3,001,549 | 9/1961 | Nelson et al. | 251—139 X |
| 3,134,932 | 5/1964 | Ray | 251—141 X |
| 2,263,819 | 11/1941 | Ray | 251—141 X |
| 3,004,546 | 10/1961 | Robins et al. | 137—82 |
| 3,126,026 | 3/1964 | Moore | 137—85 |

M. CARY NELSON, *Primary Examiner.*

R. C. MILLER, *Assistant Examiner.*